United States Patent
Pritchett et al.

(10) Patent No.: US 7,693,236 B2
(45) Date of Patent: Apr. 6, 2010

(54) IF-TO-BASEBAND CONVERSION FOR FLEXIBLE FREQUENCY PLANNING CAPABILITY

(75) Inventors: Samuel D. Pritchett, La Jolla, CA (US); Jeffrey A. Schlang, Dallas, TX (US); Sherif Embabi, Plano, TX (US); Alan Holden, McKinney, TX (US); Francesco Dantoni, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1231 days.

(21) Appl. No.: 09/851,191

(22) Filed: May 8, 2001

(65) Prior Publication Data

US 2002/0009164 A1    Jan. 24, 2002

Related U.S. Application Data

(60) Provisional application No. 60/204,301, filed on May 15, 2000.

(51) Int. Cl.
*H03K 9/00* (2006.01)

(52) U.S. Cl. .................. 375/316; 375/143; 375/343; 375/136; 375/355; 341/143

(58) Field of Classification Search ............ 375/316, 375/343, 136, 355; 341/143
See application file for complete search history.

(56) References Cited

U.S. PATENT DOCUMENTS 4,665,532 A * 5/1987 Fukuda et al. ............ 375/292

| | | | | |
|---|---|---|---|---|
| 5,442,353 A * | 8/1995 | Jackson | .............. | 341/143 |
| 5,557,642 A * | 9/1996 | Williams | .............. | 375/316 |
| 5,872,810 A * | 2/1999 | Philips et al. | .............. | 375/222 |
| 5,982,315 A * | 11/1999 | Bazarjani et al. | .............. | 341/143 |
| 6,005,506 A * | 12/1999 | Bazarjani et al. | .............. | 341/143 |
| 6,167,246 A * | 12/2000 | Elder et al. | .............. | 455/313 |
| 6,243,430 B1 * | 6/2001 | Mathe | .............. | 375/346 |
| 6,480,528 B1 * | 11/2002 | Patel et al. | .............. | 375/148 |
| 6,697,438 B2 * | 2/2004 | Doetsch et al. | .............. | 375/316 |

OTHER PUBLICATIONS

Troster et al.; An Interpolative Bandpass Converter on a 1.2-um BiCMOS Analog/Digital Array; IEEE Journal of Solid State Circuits; vol. 28, No. 4; Apr. 1993; pp. 471-477.*
www.analog.com/bulletins/comms; AD9870; IF Digitizing IC Subsystem.*
Steyaert et al.; RF Integrated Circuits in Standard CMOS Technologies; Katholieke Universiteit Leuven, ESAT-MICAS; Belgium; pp. 1-8.*
Breems et al.; A 108-mW CMOS sigma-delta Modulator with Integrated Mixer for A/D Conversion of IF Signals; IEEE Journal of Solid State Circuits; vol. 35, No. 4; Apr. 2000; pp. 468-475.*
Troster et al.; A BiCMOS Analog/Digital Array for Cellular Radio Applications; IEEE 1990 Custom Integrated Circuits Conference; pp. 12.6.1-to-12.6.4.*

\* cited by examiner

*Primary Examiner*—Sudhanshu C Pathak
(74) *Attorney, Agent, or Firm*—Lawrence J. Bassuk; W. James Brady; Frederick J. Telecky, Jr.

(57) ABSTRACT

An RF receiver apparatus (31) is provided physically separately from a cooperating baseband processor apparatus (32). The RF receiver includes a mixer circuit (33) and an analog IF-to-digital baseband converter (34) formed on an integrated circuit. Sampling frequencies of the analog IF-to-digital baseband converter are controlled by the RF receiver apparatus.

5 Claims, 3 Drawing Sheets

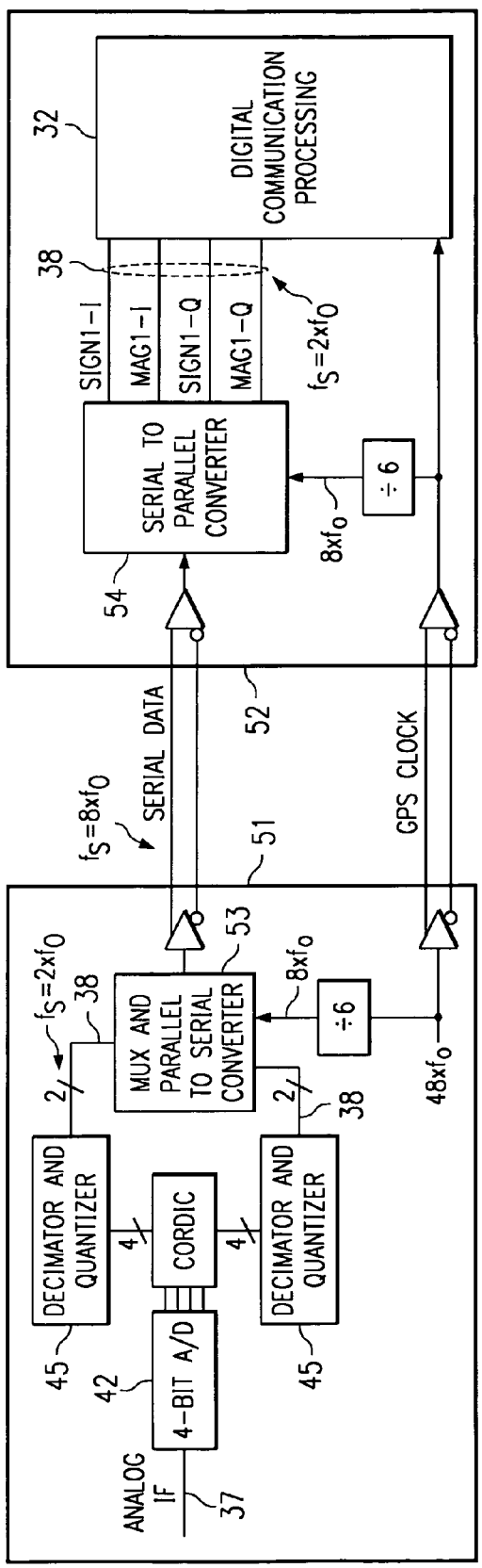
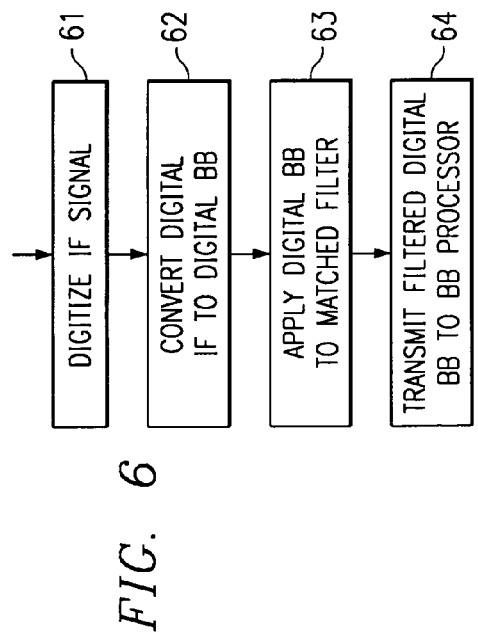
FIG. 5
FIG. 6

IF-TO-BASEBAND CONVERSION FOR FLEXIBLE FREQUENCY PLANNING CAPABILITY

This application claims the priority under 35 USC 119(e)(1) of copending U.S. provisional application No. 60/204,301 filed on May 15, 2000.

FIELD OF THE INVENTION

The invention relates generally to conversion of an intermediate frequency (IF) signal to a baseband signal in a communication receiver apparatus and, more particularly, to conversion of an analog intermediate frequency signal into a digital baseband (BB) signal.

BACKGROUND OF THE INVENTION

FIG. 1 diagrammatically illustrates pertinent portions of a conventional communication receiver apparatus including an RF receiver 11 (embodied, for example, as an integrated circuit) coupled to a baseband processor 13 (embodied, for example, as a digital signal processor integrated circuit). The portions of the communication apparatus illustrated in FIG. 1 are cooperable for converting an analog IF signal 17 produced by the RF receiver 11 into a digital baseband signal 18 upon which a digital communication processing portion 16 performs desired digital communication processing operations. An A/D converter 12 in the RF receiver 11 converts the analog IF signal 17 into a digital signal 19. This digital IF signal 19 is input to a digital IF-to-BB converter 14 which converts the digital IF signal 19 into a digital baseband signal 10. The digital baseband signal 10 is then applied to a matched filter 15 which filters the signal 10 to produce the desired digital baseband signal 18.

One example of the digital IF-to-BB converter 14 is the so-called CORDIC (COordinate Rotation DIgital Computer) circuit which receives the digital IF signal 19 from the A/D converter 12 in sign-magnitude format, and multiplies this digital signal by digital sine and cosine functions. These operations translate the digital IF signal 19 into a digital baseband signal 10 that is split into its I (in-phase) and Q (quadrature) components which are then separately filtered by the matched filter 15.

An example of the matched filter 15 is a so-called "integrate and dump" filter, which essentially sums a prescribed number of individual samples, and then takes the average of that sum. This type of digital filter processing is also commonly known as decimation.

FIG. 2 illustrates a more detailed example of the prior art IF-to-BB conversion architecture of FIG. 1. The example of FIG. 2, in which the RF receiver 11 is a GPS (Global Positioning System) receiver, illustrates exemplary disadvantages associated with the architecture of FIG. 1. As shown in FIG. 2, the design of the digital IF-to-BB converter 14 (in this case a CORDIC circuit) and matched filter 15 in the baseband processor 13 can significantly limit the frequency planning options in the RF receiver 11. Due to the design of the CORDIC circuit 14 and matched filter 15 in FIG. 2, the frequency $f_C$ of the analog IF signal 17 must be $(28/3) \times f_O$, (where $f_O$ is the bandwidth of the received RF signal, for example 1.023 MHz), and the sampling rate $f_S$ used by the A/D converter 12 must be $(112/3) \times f_O$. The relationship between the IF frequency $f_C$ and the sampling rate $f_S$ is $f_S = 4 \times f_C$, which is standard operation for many conventional CORDIC circuits.

The aforementioned requirements for the IF frequency $f_C$ and the sampling rate $f_S$ disadvantageously limit the frequency planning options in the RF receiver 11. In particular, the mixer circuitry (not explicitly shown) that produces the IF signal 17 from the input RF signal (not shown) is required to produce the IF signal 17 at $f_C = (28/3 \times f_O)$, and the A/D converter 12 is constrained to sample the IF signal 17 at $f_S = (112/3) \times f_O$. These frequencies $f_C$ and fs must have the aforementioned values in order to provide the digital baseband signal 18 at the sampling rate ($f_S = 2 \times f_O$) expected by the digital communication processing portion 16. It should therefore be clear that the design of the CORDIC 14 and matched filter 15 significantly limits frequency planning options on the RF receiver 11.

Frequency planning flexibility can be important, because today's communications systems integrate more and more complexity into smaller and smaller spaces. In addition, more communication systems are integrated into single consumer appliances. For instance, early 3G mobile phones will include dual band GSM radios, a WCDMA radio, a Bluetooth radio and a GPS receiver. As a result, there are a plethora of signals that are generated within a single device at various frequencies. In addition these signals can interact with one another creating both wanted and unwanted signals at harmonic multiples of each signal. These signals can further interact with one another through device nonlinearities to produce new signals at either the sum or difference of any of these signals.

Consequently, the frequency planning of each radio must take into account all the other signals that can be present within a single device (as well as those signals that impinge upon the device's antenna). This is a complex task that requires judicious selection of each local oscillator (LO) and intermediate frequency (IF) signal source or information channel. By judiciously choosing these signal frequencies with respect to one another, the communication system designer can ensure these signal sources do not interact with one another in a fashion that degrades the performance of any of the individual radios within the device.

It is therefore desirable to provide for more flexibility in the frequency plan of the RF receiver in communication receivers of the type illustrated in FIGS. 1 and 2.

According to the invention, the digital IF-to-BB converter and the matched filter are integrated into the RF receiver, thereby advantageously avoiding the IF frequency and sampling frequency restrictions imposed by the baseband processor design in prior art architectures.

BRIEF DESCRIPTION OF THE DRAWINGS

FIG. 5 diagrammatically illustrates a more detailed embodiment of the analog IF-to-digital BB converter of FIGS. 3 and 4.

FIG. 6 illustrates exemplary operations which can be performed by the communication receiver embodiments of FIGS. 3-5.

DETAILED DESCRIPTION

Figure 3:
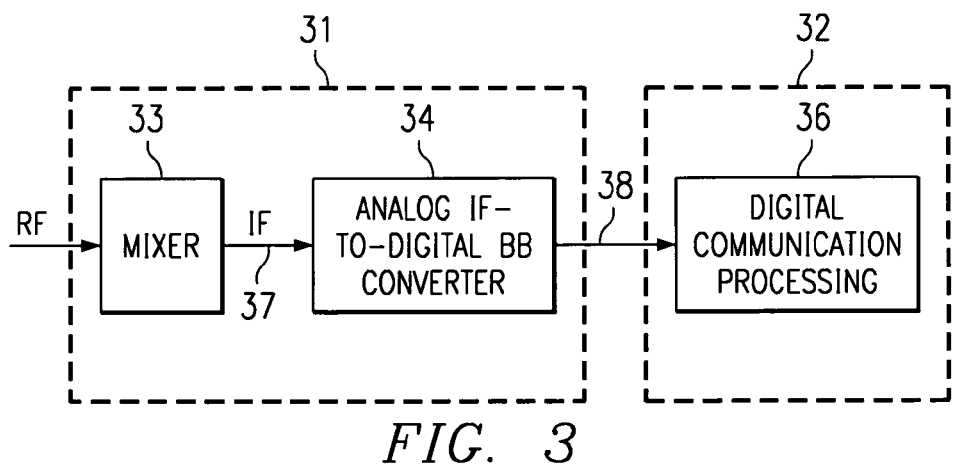
FIG. 3 diagramatically illustrates pertinent portions of exemplary embodiments of a communication receiver according to the invention.

FIG. 3 diagrammatically illustrates pertinent portions of exemplary embodiments of a communication receiver (or the receiver portion of a transceiver) according to the invention. The communication receiver of FIG. 3 can be provided in exemplary devices such as mobile telephones, laptop computers and personal digital assistants. In the example of FIG. 3, the analog IF-to-digital BB conversion is performed by a converter 34 integrated within the RF receiver 31. In the embodiments illustrated in FIG. 3, the converter 34 can produce a digital baseband signal 38. The signal 38 can be input to a baseband processor 32 (for example a digital signal processor integrated circuit), where it is applied to a digital communication processing portion 36 of the type shown at 16 in FIGS. 1 and 2. The RF receiver 31 also includes a conventional mixer 33 for mixing an input RF signal down to an IF signal 37. By integrating the analog IF-to-digital BB conversion into the RF receiver 31 (for example an RF receiver integrated circuit), the frequency planning restrictions imposed by prior art architectures such as shown in FIGS. 1 and 2 can be avoided, thereby significantly enhancing the frequency planning options of the RF receiver 31.

Figure 4:
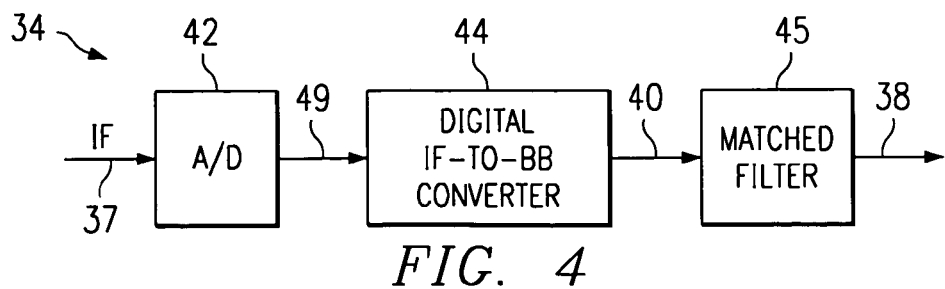
FIG. 4 diagramatically illustrates exemplary embodiments of the analog IF-to-digital BB converter of FIG. 3.

FIG. 4 diagrammatically illustrates exemplary embodiments of the analog IF-to-digital BB converter 34 of FIG. 3. In FIG. 4, the IF signal 37 is digitized by an A/D converter 42 to produce a digital IF signal 49 that is input to a digital IF-to-BB converter 44. The converter 44 outputs a first digital baseband signal 40 which is applied to a matched filter 45 that in turn produces a second digital baseband signal 48. In some embodiments, the converter 44 can be, for example, a conventional CORDIC circuit. In some embodiments, the matched filter 45 can be realized as a pair of decimeters of the same general type described above with respect to FIG. 2.

Figure 1:
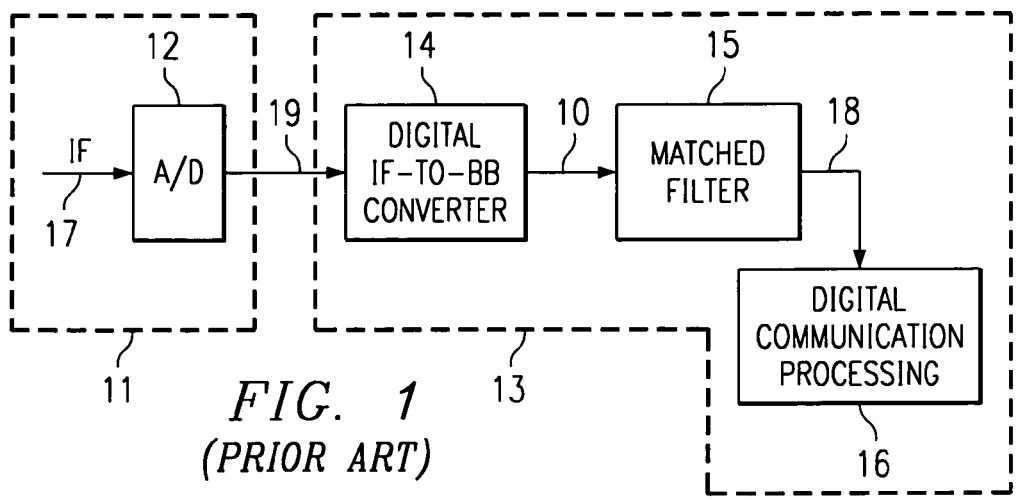
FIG. 1 diagramatically illustrates an IF-to-BB conversion architecture utilized in a prior art communication system.
Figure 2:
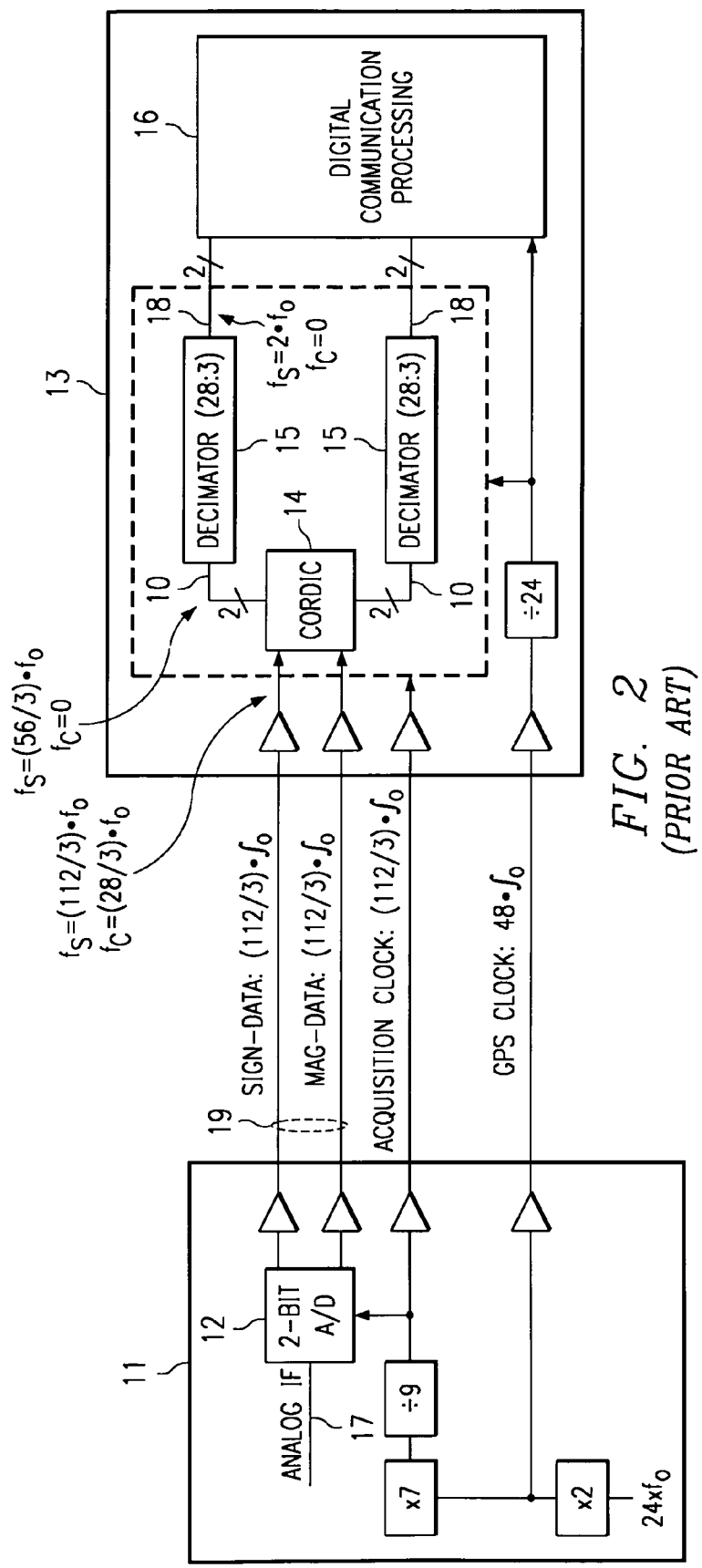
FIG. 2 diagramatically illustrates a detailed example of the prior art architecture of FIG. 1.

In some embodiments, the digital baseband signal 38 produced by the analog IF-to-digital BB converter 34 of FIGS. 3 and 4 is the same as the digital baseband signal illustrated at 18 in FIGS. 1 and 2. However, by integrating the converter 34 into the RF receiver 31, the frequency plan options in the RF receiver 31 are advantageously enhanced. For example, and referring also to FIG. 2, in order to make the digital baseband signal 38 the same as signal 18 at a sampling frequency $f_S=2 \times f_O$, the RF receiver 31 of FIGS. 3 and 4 can utilize any desired frequency plan, as long as the digital baseband signal 38 provided to the digital communication processing portion 36 of the baseband processor 32 has a sampling frequency of $2 \times f_O$. Therefore, the design of the digital IF-to-BB converter 44 and the matched filter 45 can be adjusted as desired to accommodate a desired frequency plan with respect to the frequency $f_C$ of the IF signal 37 and the sampling frequency $f_S$ used to operate A/D converter 42. This arrangement advantageously permits the manufacturer or user of the RF receiver (which will typically be provided physically separately from the baseband processor) to retain control over frequency plan considerations.

Although the sampling frequency of the signal 38 in the example given above is $2 \times f_O$, it should be clear that the embodiments of FIGS. 3 and 4 can support any sampling rate for signal 38 that is at least $2 \times f_O$ and is advantageous from a signal processing perspective.

For example, in embodiments which utilize a CORDIC circuit as the converter 44, all that is required is that $f_S=4 \times f_C$, namely that the sampling frequency of A/D converter 42 is 4 times the frequency of the IF signal 37. Thus, by suitably designing the converter 44 and matched filter 45, any desired combination of $f_C$ and $f_S$ can be accommodated, thereby advantageously enhancing the frequency plan flexibility in the RF receiver 31. Furthermore, clock generation complexity is reduced, because the clocks for the A/D converter 42 and the matched filter 45 can be derived from a reference clock (e.g. PLL or DDFS) frequency of the RF receiver.

FIG. 5 illustrates a more detailed exemplary embodiment of the analog IF-to-digital BB converter 34 of FIGS. 3 and 4, specifically, a GPS receiver embodiment. In the example of FIG. 5, the A/D converter 42 is a 4 bit A/D converter, and the digital IF-to-BB converter 44 is a CORDIC circuit. In the embodiment of FIG. 5, the matched filter 45 is realized as a combined decimator and quantizer. Thus, the output of the CORDIC circuit 44 is first decimated, for example in the same general manner described above, and the decimated result is then quantized from 4 bits per sample to 2 bits per sample.

Also in the embodiment of FIG. 5, the 4 parallel signals provided at 38 by the matched filter 45, namely the I magnitude and sign signals and the Q magnitude and sign signals, are input to a multiplexer and parallel-to-serial converter unit 53 which converts these 4 parallel signals into serial format for transmission to the baseband processor 52. The baseband processor 52 includes a complementary serial-to-parallel converter 54 which converts the serial data back into parallel format, thereby to provide the digital communication processing portion 36 with the signal 38. This serial transmission of the signal 38 advantageously reduces the number of connections (and pin count) between the RF receiver 51 and the baseband processor 52. In some embodiments, this reduction in connections permits the remaining connections to be advantageously realized as differential connections, such as Low Voltage Differential Signaling (LVDS) or differential PECL, rather than CMOS, TTL or the single ended PECL connections shown in FIG. 2, thereby providing enhanced noise immunity and suppression of spurious signals. Moreover, because the CORDIC circuit 44 and matched filter 45 are integrated into the RF receiver 51, the receiver 51 need not provide the sampling (acquisition) clock to the baseband processor 52, thereby eliminating another connection from between the RF receiver 51 and baseband processor 52, as compared, for example, to the arrangement of prior art FIG. 2. The clock for the parallel-to-serial converter at 53 can be derived from the same reference clock as are the clocks for A/D converter 42 and matched filter 45. Also, a reference clock can be passed from the RF receiver to the baseband processor (see GPS clock in FIG. 5) for use (e.g., after suitable dividing down) in signal processing and serial-to-parallel conversion.

In some embodiments, the 4 parallel signals at 38 can be transmitted in parallel to the baseband processor in the same general fashion that the parallel signals at 19 are transmitted in FIG. 2.

Comparing FIGS. 2 and 5, note that the sampling rate (i.e. data rate) of the digital signaling between the RF receiver and the baseband processor is much lower in FIG. 5, which advantageously reduces power consumption in the communication receiver. The lower data rate of FIG. 5 also facilitates use of the serial data link. The lower data rate also facilitates higher-resolution sampling, for example the 4-bit A/D converter 42 of FIG. 5, and corresponding quantization in the matched filter 45.

In some embodiments, for example, twelve parallel signals from the matched filter are segmented into three serial data streams of four bits each for transmission to the baseband processor, where they are reproduced by appropriate serial-to-parallel conversion.

FIG. 6 illustrates exemplary operations which can be performed by the RF receiver embodiments of FIGS. 3-5. At 61, the IF signal is digitized. At 62, the digitized IF signal is converted to a digital baseband signal. At 63, the digital baseband signal is applied to a matched filter. At 64, the filtered digital baseband signal is transmitted to the baseband processor.

Although exemplary embodiments of the invention are described above in detail this does not limit the scope of the invention, which can be practiced in a variety of embodiments.

What is claimed is:

1. An RF receiver integrated circuit, comprising:
   A. a substrate of semiconductor material;
   B. mixer circuitry, formed on the substrate, having an input for receiving an analog RF signal with a bandwidth of $f_o$ and an output for supplying an analog IF signal of frequency $f_c$ in response to receiving the analog RF signal;
   C. analog to digital converter circuitry, formed on the substrate, having an input connected with the output of the mixer circuitry and having four parallel outputs carrying signals representing a digital IF signal, the converter circuitry having a sampling frequency $f_s$ of four times $f_c$;
   D. CORDIC circuitry, formed on the substrate, having four parallel inputs connected with the four parallel outputs of the converter circuitry, a first set of four outputs, and a second set of four outputs;
   E. first decimator and quantizer circuitry, formed on the substrate, having inputs connected with the first set of four outputs and an output of two bits supplying signals at a sampling frequency of $2 \times f_o$;
   F. second decimator and quantizer circuitry, formed on the substrate, having inputs connected with the second set of four outputs and an output of two bits supplying signals at a sampling frequency of $2 \times f_o$;
   G. multiplex and serial to parallel circuitry, formed on the substrate, having inputs connected with the outputs of the first and second decimator and quantizer circuitry and having a serial output; and
   H. first differential transmitter circuitry, formed on the substrate, having an input connected with the serial output and having first differential serial outputs for sending signals at a sampling rate of $8 \times f_o$ from the substrate.

2. The integrated circuit of claim 1 in which the multiplex and serial to parallel circuitry has a clock signal input, and including a clock lead, formed on the substrate, carrying a clock signal at a frequency of $48 \times f_o$, first divider circuitry having an input connected to the clock lead and an output providing a clock signal at $8 \times f_o$ connected to the clock signal input of the multiplex and serial to parallel circuitry.

3. The integrated circuit of claim 2 including a second integrated circuit including:
   A. first differential receiver circuitry having differential serial inputs connected with the first differential serial outputs and a serial output;
   B. serial to parallel converter circuitry having a serial input connected with the serial output of the first differential receiver circuitry and parallel outputs carrying respectively a SIGN1-I signal, a MAG1-I signal, a SIGN1-Q signal, and a MAG1-Q signal, at a frequency of $2 \times f_o$, and
   C. digital communication processing circuitry having inputs connected with the parallel outputs.

4. The integrated circuit of claim 2 including second differential transmitter circuitry, formed on the substrate, having an input connected with the clock lead and having second differential serial outputs for sending clock signals at a sampling rate of $48 \times f_o$ from the substrate.

5. The integrated circuit of claim 4 including a second integrated circuit including:
   A. first differential receiver circuitry having differential serial inputs connected with the first differential serial outputs and a serial output;
   B. second differential receiver circuitry having differential serial inputs connected with the second differential serial outputs and a serial output;
   C. second divider circuitry having an input connected with the serial output of the second differential receiver circuitry and an output supplying a clock signal at a frequency of $8 \times f_o$;
   D. serial to parallel converter circuitry having a serial input connected with the serial output of the first differential receiver circuitry, a clock input connected with the output of the second divider circuitry, and parallel outputs carrying respectively a SIGN1-I signal, a MAG1-I signal, a SIGN1-Q signal, and a MAG1-Q signal, at a frequency of $2 \times f_o$; and
   D. digital communication processing circuitry having inputs connected with the parallel outputs and a clock input connected with the serial output of the second differential receiver circuitry.

* * * * *